US009577742B1

(12) United States Patent
Bantoft

(10) Patent No.: US 9,577,742 B1
(45) Date of Patent: Feb. 21, 2017

(54) DATA COMPRESSION AND ACCELERATION FOR AIR TO GROUND COMMUNICATIONS

(71) Applicant: Satcom Direct, Inc., Satellite Beach, FL (US)

(72) Inventor: Ken Bantoft, Melbourne, FL (US)

(73) Assignee: Satcom Direct, Inc., Melbourne, FL (US)

( * ) Notice: Subject to any disclaimer, the term of this patent is extended or adjusted under 35 U.S.C. 154(b) by 95 days.

(21) Appl. No.: 14/259,796

(22) Filed: Apr. 23, 2014

Related U.S. Application Data

(60) Provisional application No. 61/889,183, filed on Oct. 10, 2013.

(51) Int. Cl.
*H04B 7/185* (2006.01)

(52) U.S. Cl.
CPC ..... *H04B 7/18584* (2013.01); *H04B 7/18508* (2013.01); *H04B 7/18513* (2013.01)

(58) Field of Classification Search
USPC ............... 370/316, 328, 338, 389, 392, 401
See application file for complete search history.

(56) References Cited

U.S. PATENT DOCUMENTS

| | | |
|---|---|---|
| 5,493,309 A | 2/1996 | Bjornholt |
| 5,937,349 A | 8/1999 | Andresen |
| 5,959,560 A | 9/1999 | Said |
| 6,014,606 A | 1/2000 | Tu |
| 6,151,497 A | 11/2000 | Yee |
| 6,201,797 B1 | 3/2001 | Leuca |
| 6,400,945 B1 | 6/2002 | Jensen et al. |
| 6,741,841 B1 | 5/2004 | Mitchell |
| 6,781,968 B1 | 8/2004 | Colella |
| 6,892,069 B1 | 5/2005 | Flynn |
| 6,954,794 B2 | 10/2005 | Rudd |
| 6,970,704 B2 | 11/2005 | Jensen et al. |
| 6,978,128 B1 | 12/2005 | Raman |

(Continued)

FOREIGN PATENT DOCUMENTS

WO 2007134498 11/2007

OTHER PUBLICATIONS

Marpe, et al, A Two-Layered Wavelet-Based Algorithm for Efficient Lossless and Lossy Image Compression, IEEE Transactions on Circuits and Systems for Video Technology, 2000, pp. 1094-1102, vol. 10, No. 7.

(Continued)

*Primary Examiner* — Ricky Ngo
*Assistant Examiner* — Christine Ng
(74) *Attorney, Agent, or Firm* — Brian S. Steinberger; Law Offices of Brian S. Steinberger, P.A.

(57) ABSTRACT

Systems, methods and devices for mobile ground-to-air and air-to-ground communication network acceleration. The aircraft-based data acceleration device, system and method creates a faster connection to increase data throughput by accelerating, compressing (when possible) and or caching frequency transmitted data streams. The data communication network acceleration system and method integrates use of acceleration, compression, and caching technologies in the ground-based communication system and the aircraft-based data communication accelerator and corresponding onboard data communication router.

19 Claims, 3 Drawing Sheets

(56) References Cited

U.S. PATENT DOCUMENTS

| | | |
|---|---|---|
| 7,023,365 B1 | 4/2006 | Mitchell |
| 7,027,898 B1 | 4/2006 | Leger et al. |
| 7,177,939 B2 | 2/2007 | Nelson et al. |
| 7,209,978 B2 | 4/2007 | Thubert |
| 7,436,762 B2 | 10/2008 | Oka |
| 7,660,579 B2 | 2/2010 | Jensen |
| 7,761,793 B1 | 7/2010 | Mitchell |
| 7,852,819 B2 | 12/2010 | Gil |
| 8,305,936 B2 | 11/2012 | Wang |
| 8,339,991 B2 | 12/2012 | Biswas |
| 8,432,808 B1 | 4/2013 | Dankberg |
| 8,477,771 B2 | 7/2013 | Biswas |
| 8,527,662 B2 | 9/2013 | Biswas |
| 9,008,868 B1 | 4/2015 | Bantoft et al. |
| 9,318,024 B1 | 4/2016 | Natwick et al. |
| 2003/0055975 A1 | 3/2003 | Nelson |
| 2003/0123481 A1* | 7/2003 | Neale ............ H04B 7/18582 370/466 |
| 2004/0064588 A1 | 4/2004 | Jungck |
| 2005/0041859 A1 | 2/2005 | Nguyen |
| 2005/0053026 A1* | 3/2005 | Mullan ........... H04B 7/18508 370/316 |
| 2005/0083358 A1 | 4/2005 | Lapstun |
| 2005/0177647 A1 | 8/2005 | Anantha |
| 2005/0215238 A1 | 9/2005 | Macaluso |
| 2005/0215249 A1 | 9/2005 | Little |
| 2005/0220055 A1 | 10/2005 | Nelson |
| 2005/0244060 A1 | 11/2005 | Nagarajan |
| 2006/0013264 A1 | 1/2006 | Eichler |
| 2006/0092897 A1 | 5/2006 | Pirila |
| 2006/0115164 A1 | 6/2006 | Cooley |
| 2006/0156357 A1 | 7/2006 | Lockridge |
| 2006/0293049 A1* | 12/2006 | Jensen ............ H04B 7/18502 455/431 |
| 2007/0123290 A1 | 5/2007 | Stenmark |
| 2008/0182573 A1 | 7/2008 | Lauer |
| 2009/0109849 A1* | 4/2009 | Wood .................. H04L 47/10 370/235 |
| 2009/0304096 A1 | 12/2009 | Khattab |
| 2010/0279698 A1 | 11/2010 | Wong |
| 2011/0046842 A1 | 2/2011 | Smith |
| 2011/0063980 A1 | 3/2011 | Kondo |
| 2011/0114726 A1* | 5/2011 | Porter .................... F41G 5/08 235/411 |
| 2011/0149849 A1 | 6/2011 | Brownrig |
| 2011/0255506 A1* | 10/2011 | Toth et al. ......... H04B 7/18506 370/331 |
| 2012/0033851 A1 | 2/2012 | Chen |
| 2012/0083971 A1 | 4/2012 | Preston |
| 2012/0109447 A1 | 5/2012 | Yousefi et al. |
| 2012/0232791 A1 | 9/2012 | Sterkel |
| 2012/0303826 A1 | 11/2012 | Nelson |
| 2013/0103786 A1* | 4/2013 | Miglore .................. G06F 17/30 709/217 |
| 2013/0120166 A1* | 5/2013 | Kommuri ............ G08G 5/0013 340/971 |
| 2013/0158821 A1 | 6/2013 | Ricci |
| 2013/0235728 A1 | 9/2013 | Le |
| 2013/0297103 A1 | 11/2013 | Baker et al. |
| 2014/0045520 A1 | 2/2014 | Lim |
| 2014/0137162 A1 | 5/2014 | McNamee |

OTHER PUBLICATIONS

Linux man page, gzip, gunzip, zcat—compress or expand files, 2002, 7 pages.

Rockwell Collins, EBACE 2012 Press Kit, retrieved on Oct. 4, 2013, retrieved from http://www.rockwellcollins.com/sitecore/content/Data/News/2012_2012_Yr/CS/FY12CSN, 2 pages.

Vandel, et al., Head-Up Guidance System Technology—A Clear Path to Increasing Flight Safety, Flight Safety Foundation, 2009, 29 pages.

Rockwell Collins, Ascend Mobile Applications, 2012, 2 pages.

Rockwell Collins, Falcon Cabin HD, Elevate your flight experience, 2012, 12 pages.

Rockwell Collins, Pro Line Fusion Advanced Avionics, 2011, 8 pages.

Rockwell Collins, Venue High-Definition Cabin Management System, 2012, 12 pages.

Rockwell Collins, Rockwell Collins to provide advanced cabin management and HD entertainment system for Falcon 7X and Falcon 900LX, News Release, 2012, 1 page.

Rockwell Collins, Jet Aviation St. Louis to install Rockwell Collins' Venue HD cabin system on a Global Express, News Release, 2012, 2 pages.

Rockwell Collins, Airshow 4000, retrieved on Oct. 4, 2013, retrieved from http://www.rockwellcollins.com/sirecore/content/Data/Products/Cabin/Moving_Map_system, 2 pages.

Rockwell Collins, Airshow App for Mobile Devices, 2012, 4 pages.

Rockwell Collins, Airshow 4000 Version 2, 2013, 9 pages.

\* cited by examiner

DATA COMPRESSION AND ACCELERATION FOR AIR TO GROUND COMMUNICATIONS

CROSS REFERENCE TO RELATED APPLICATIONS

This invention claims the benefit of priority to U.S. Provisional Application Ser. 61/889,183 filed Oct. 10, 2013. The entire disclosure of the application listed in this paragraph is incorporated herein by specific reference thereto.

FIELD OF THE INVENTION

This invention relates to satellite communication systems and, in particular, to methods, systems and devices for data compression, optimization and or acceleration for air to ground and ground to air communications and caching frequently accessed data.

BACKGROUND AND PRIOR ART

There are several types of satellites deployed into orbit around the earth. Some satellites reflect communications directed at the satellite. Many satellites carry repeaters for receiving and retransmitting a received communication. In recent years, satellites have been placed in orbits synchronous with the earth's rotation, thereby providing continuous communications capabilities in almost all regions of the globe.

If a satellite is placed in synchronous orbit above the equator to revolve in the same direction of the earth's rotation and synchronized with the earth's rotation, the satellite will continually remain above a fixed point on the surface of the earth. Many communications satellites have been placed in these synchronous orbits to cover different regions of the globe.

Generally, active communications satellites are orbiting repeaters with broadband characteristics. A signal from a ground station is intercepted by the satellite, converted to another frequency, and retransmitted at a moderate power level to an end user receiver. This provides much better signal strength at the receiving end of the circuit as compared with a signal that is merely reflected from a passive satellite. Active communications satellites are placed in synchronous orbits, making it possible to use them with fixed antennas, a moderate level of transmitter power, and at any time of the day or night. Synchronous satellites are used for television and radio broadcasting, communications, weather forecasting, and military operations.

Further, a constellation of satellite systems is used to cover major regions of the globe to enable ground-to-aircraft (and aircraft-to-ground) communications via the satellite systems. One example of such a constellation is INMARSAT III, which currently comprises four satellites located in geostationary orbits, each generally covering a region of approximately one-fourth of the globe with a certain amount of overlap between regions. These satellites are referred to as AOR-W (Atlantic Ocean Region—West), AOR-E (Atlantic Ocean Region—East), IOR (Indian Ocean Region), and POR (Pacific Ocean Region). Another satellite constellation example is INMARSAT IV, which will comprise three satellites providing the same coverage as the four INMARSAT III satellites it will replace as well as additional services, such as Broadband Global Area Network (BGAN) and Swift Broadband (SBB).

INMARSAT® satellites support various different types of communications services to the aeronautical market. These services are currently defined as AERO H, AERO H+, AERO I, Swift 64, and AERO M. SBB will also soon be available and is similar to BGAN but designed for AERO. All of these services are generally available to aeronautical users. An airborne satellite communication system can provide an aircraft with multiple digital voice, fax, and real-time Internet communications capabilities. These systems are specifically adapted for use in global two-way, ground-to-air communications by aircraft operators requiring global voice, fax, and Internet communications for their flight crews and passengers.

As the general communications need to transmit more data in larger files at faster speeds grows, so too does the need for faster connections and increased data throughput. This holds true for any communications system, whether strictly ground-based, air-to-ground, or ground-to-air. One way developers of ground-based systems have addressed this need is through the use of acceleration and compression technologies. Acceleration and compression can be achieved through any number of techniques to reduce data traffic volumes such as selective caching, vertical data analysis, adaptive packet compression, packet aggregation and flow control, and so on. This ground-based technology contributes to increasingly faster connection speeds.

Prior art ground stations typically only provide connection speeds of 33.6 kbps on a single Mobile Packet Data Service (MPDS) channel or up to 256 kbps on a four-channel system. For example, one current method for obtaining greater speeds in a Swift 64 ground-to-air communication system is to install additional Swift 64 units on the aircraft and combine the units to create a higher speed connection. This method of using more channels, without increasing the data transfer rate across any individual channel may increase overall connection speed, but not in an efficient, cost-effective manner.

U.S. Pat. No. 7,660,579 to Jensen, which is incorporated by reference in its' entirety, titled Communication network acceleration system and method describes mobile ground-to-air and air-to-ground communication network acceleration that reduced the cost of airborne communication services by creating a faster connection and increasing data throughput. In one embodiment, the communication network acceleration system and method provide as much as a four-fold increase over standard high-speed data rates. This increase is made possible in part through the integration, implementation, and use of acceleration and compression technologies in the ground system that supports communications to and from an airborne terminal.

U.S. Pat. No. 7,761,793 to Mitchell, which is incorporated by reference in its' entirety, describes a method of data compression for compressing a web page with graphics files, text files, JAVA scripts, and HTML files. This method is used for storing the graphics files, the text files, the JAVA scripts, and the HTML files in a temporary directory. The graphics files are sorted into lossless and lossy file groups. The lossy files, the lossless files, the text files, the JAVA scripts, and the HTML files are concatenating and then compressed to yield a compressed web page. The lossy files may be de-featured and transcoded before concatenation. The lossless files may be subsampled or decimated before concatenation to match client display size. Lossy files may be de-featured to match client display size by subsampling and reducing image fidelity. Optimal file concatenation size range is determined to optimally develop compression performance while minimizing latency. The concatenated file size is regulated to the optimal file concatenation size. The '793 patent only deals with HTML/Javascript and requires temporary directories.

To solve the problems of disparate connections speeds between ground-based and ground-to-air based communication systems associated with the prior art systems and methods, what is needed is methods and systems that expand the capability of compression and acceleration to support multiple air-to-ground communication systems.

SUMMARY OF THE INVENTION

A primary objective of the present invention is to provide methods, systems and devices for expanding the capability of compression and acceleration to support multiple air-to-ground communication systems and increase the effective network capacity of ground-to-air and air-to-ground communication.

A secondary objective of the present invention is to provide methods, systems and devices for increasing the effective network capacity of ground-to-air GTA and air-to-ground ATG communication systems by creating a faster connection, caching frequently access data, and thus increasing data throughput.

A third objective of the present invention is to provide methods, systems and devices for storing frequently accessed data streams in a cache memory at one or both the mobile aircraft communication device and the ground based communication system to decrease or eliminate the need for retransmitting duplicate data streams upon request.

A first embodiment provides an accelerated ground-to-air and air-to-ground communication system that includes at least one mobile aircraft-based communication system adapted to transmit and receive accelerated and or compressed data signals, the aircraft-based communication system includes an onboard data communication router device adapted to route accelerated and non-accelerated signals, a multi-user onboard data communication accelerator device communicatively coupled to the onboard data communication router device and to a data network and adapted to accelerate and decelerate data signals from the data network and the onboard data communication router device, and a cache memory integrated with the onboard data communication accelerator device for storing and tracking frequently accessed data streams, a ground-based communication systems adapted to accelerate and or compress data signals for transmission and to receive accelerated and/or compressed data signals, decelerate and/or decompress the data signals, and cache and track the frequently accessed data streams at the ground-based communication system, and a satellite communication system communicatively coupled to the mobile air communication systems and to the ground-based communication system and adapted to transmit accelerated and non accelerated data signals between the mobile air communication systems and the ground-based communication systems.

The ground-based communication systems includes a ground based data communication router device adapted to route accelerated and non-accelerated signals, a multi-user ground based data communication accelerator device communicatively coupled to the ground based data communication router device and to a data network, and adapted to accelerate and decelerate data signals from the data network and the ground based data communication router device, and a ground based cache memory coupled with the ground based data communication router for storing and tracking frequently accessed data streams.

The mobile aircraft-based communication systems further includes a data communication device communicatively coupled to the data communication accelerator device and adapted to generate and receive non-accelerated data signals.

The data communication device is selected form the group consisting of a computer device, a laptop computer device, a cell phone, a personal digital assistant (PDA), a media device, and a mobile data device.

The mobile aircraft-based communication system is further adapted to transmit and receive non-accelerated data signals, the ground-based communication system is further adapted to transmit and receive non-accelerated data signals, and the satellite communication systems is further adapted to transmit non-accelerated data signals between the mobile air communication system and the ground-based communication system.

The satellite communication system includes one or more of Inmarsat, Swiftbroadband, Swift64, Ku-Band, and Ka-Band satellite connections. The communicative coupling between the multi-user data communication accelerator device and the data network can include at least one selected from the group consisting of an ISDN channel, a Swift-BroadBand channel, WiFi network connectivity on the aircraft, and a 3G/4G cellular network connectivity when the aircraft is on the ground. the satellite communication system can further be adapted to transmit accelerated data signals between the mobile air communication system and the ground-based communication system as a data packet selected from the group consisting of an ISDN packet, a Swift64 packet, a SwiftBroadBand packet, a Ku-Band packet, and a Ka-Band packet.

The onboard data communication router device is communicatively coupled to the data network and adapted to route non-accelerated data signals to the data network by bypassing the multi-user onboard communication accelerator device and can be adapted to route accelerated and non-accelerated data signals according to an IP address.

A second embodiment provides a method of accelerating ground-to-air and air-to-ground communication that includes the steps of initiating a request for data or data transmission by a data device onboard a mobile aircraft and sending the request for data from the data device to an onboard data communication router, generating a data stream including the data request or data transmission at the onboard data communication router, one or more of accelerating, compressing and caching the data stream at an aircraft based data accelerator device coupled with the onboard data communication router, transmitting the accelerated and or compressed data stream from the mobile aircraft to a ground-based communication system through a satellite communication system, one or more of decelerating, decompressing and caching the data stream at the ground-based communication system, and routing the decelerated and decompressed data stream to a destination.

The method further includes receiving requested data from a destination source at a data communication accelerator at the ground-based communication system, determining if a destination IP address of an aircraft is recognized as compatible with acceleration, compression and caching, one or more of accelerating and compressing the requested data when the destination IP address is recognized as compatible with acceleration, transmitting the accelerated and or compressed data by satellite to the onboard data communication router, decelerating and or decompressing the accelerated data by the onboard data communication accelerator, and sending the decelerated and or decompressed data to the requesting data device.

The method can also include receiving the requested data at the ground-based communication system from a destination source, determining if a content of the requested data is cachable, identifying the content with a unique identifier when the content is cachable, sending the uniquely identified content to the onboard data communication router, and sending the requested data to the onboard data communication router when it is determined that the content is not cachable; and can include tracking the cached data and upon request for the cached data, indicating that the cached data stored on the aircraft based data communication accelerator device can be reused instead of retransmitting the requested data stream. Determining cachable content includes determining that the content is one of a text/html data, a Javascript file or an advertisement.

The method can also include bypassing the aircraft based data accelerator device and transmitting the generated data stream from the onboard data communication router.

The transmitting step can include simultaneously using two or more satellite connections with in orbit communication satellites while the aircraft is in flight. Or can include selecting at least one communication channel from the group consisting of an ISDN channel and a SwiftBroadband channel or simultaneously using one or more of Swiftbroadband, Swift64, Ku-Band, and Ka-Band satellite connections.

A third embodiment provides an accelerated ground-to-air and air-to-ground communication system that includes at least one mobile aircraft-based communication systems adapted to transmit and receive accelerated and or compressed data signals, the ground-based communication system that includes an onboard data communication router device adapted to route accelerated and non-accelerated signals, a multi-user onboard data communication accelerator device communicatively coupled to the onboard data communication router device and to a data network and adapted to accelerate, compress, and cache and decelerate and decompress data signals from the data network and the data communication router device, and a cache memory integrated with the onboard data communication accelerator for storing and tracking frequently accessed data streams; a ground-based communication system adapted to transmit and receive accelerated and or compressed data signals, the ground-based communication system that includes a ground based data communication router device adapted to route accelerated and non-accelerated signals, a ground based multi-user data communication accelerator device communicatively coupled to the data communication router device and to a data network and adapted to accelerate, compress and cache and decelerate and decompress data signals from the data network and the data communication router device, and a cache memory integrated with the ground based multi-user data communication accelerator device for storing and tracking frequently accessed data streams; and a satellite communication system communicatively coupled to the mobile air communication systems and to the ground-based communication system and adapted to transmit accelerated data signals between the mobile air communication systems and the ground-based communication systems.

Further objects and advantages of this invention will be apparent from the following detailed description of preferred embodiments which are illustrated schematically in the accompanying drawings. The above summary of the invention is not intended to describe each illustrated embodiment or every implementation of the present invention. The figures and the detailed description that follow more particularly exemplify these embodiments.

DESCRIPTION OF THE PREFERRED EMBODIMENTS

Figure 1:
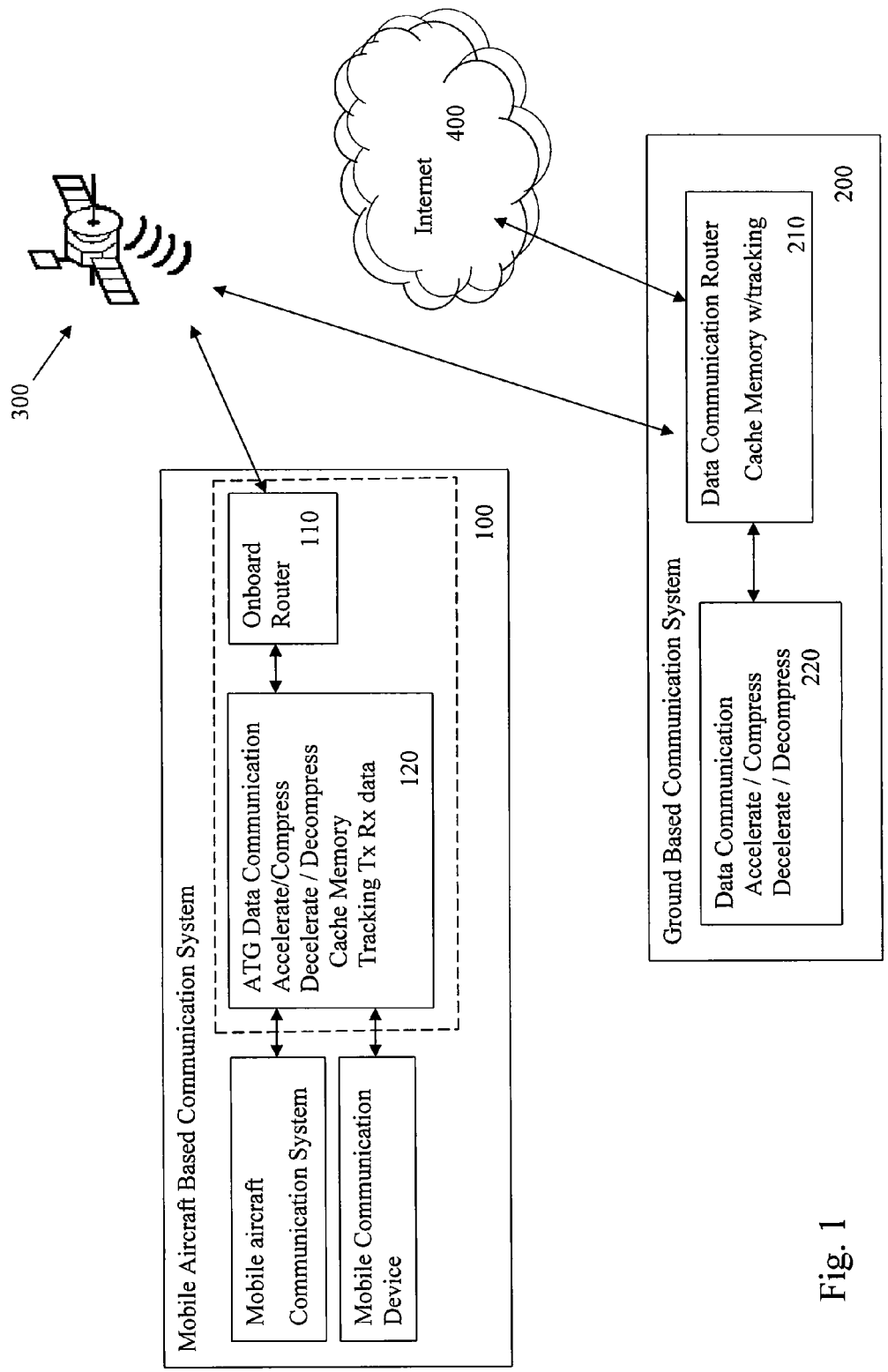
FIG. 1 is a system block diagram for air-to-ground and ground-to-air communication.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

A list of components will now be described.
100 mobile aircraft-based communication system
110 onboard router
120 data communication accelerator
200 ground-based communication system
210 data communication router
220 data communication accelerator
300 communication satellite
400 Internet
510 request data
520 generate data stream
530 receive data stream
540 accelerate/optimize/cache decision
550 accelerate, optimize, cache
555 encapsulate optimized data
560 send data to aircraft
570 receive data from ground
580 data encapsulated decision
590 decapsulate, decelerate, optimize, retrieve
595 requesting device receives data The term space craft covers both fixed wing and rotary aircraft, such as but not limited to private jets and commercial jets, helicopters and small aircraft flying within normal aircraft ranges, as well as outer-space craft for orbiting the earth or traveling outside the earth such as satellites. Communication between aircraft and ground stations is via satellite connectivity.

This patent application expands the capability of the acceleration described and claimed in U.S. Pat. No. 7,660,579 to Jensen issued on Feb. 9, 2010 to support multiple air-to-ground communications systems. The '579 patent is assigned to the same assignee of the subject application and is incorporated herein by reference.

The systems and methods of the present invention addresses the problem of disparate connections speeds between ground-based and ground-to-air based communication systems by increasing the effective network capacity of ground-to-air (GTA) and air-to-ground (ATG) communication systems. The performance of airborne communication services is improved by creating a faster connection, caching frequently accessed data, and thereby increasing data throughput.

The onboard data communication accelerator of the present invention delivers extreme speed for corporate jet travelers requiring a higher level of in-flight aircraft Internet usage. The data communication accelerator puts the "speed" in high-speed data transmission by compressing data to create a more efficient use of bandwidth. As a result, business jet professionals can send and receive greater amounts of data in shorter amounts of time while in flight, thus using less time to complete business.

In one embodiment, an accelerated GTA and ATG communication system comprises at least one mobile aircraft-based communication system, a ground-based communication system, and a satellite communication system as shown in FIG. 1.

The mobile aircraft-based communication system 100 is adapted to transmit and receive accelerated, compressed (when possible) data signals and comprises a data communication accelerator device 120 adapted to accelerate and decelerate data signals received by the mobile aircraft-based communication system and to accelerate data generated from within the aircraft. Furthermore, once the data has been transmitted or received, it can then be cached—stored locally on the data communication accelerator; so future requests for the same data block do not require retransmission.

The ground-based communication system 200 is adapted to transmit and receive accelerated and optionally compressed data signals and includes a data communication router device 210 adapted to route accelerated and non-accelerated data signals. The data communication router device 210 also caches data as required, and keeps track of data that has been transmitted to an aircraft based data communications accelerator 120 so that it may indicate that cached data stored on the aircraft based data communications accelerator may be reused instead of retransmitting the data.

An airborne satellite communication system provides an aircraft with multiple digital voice, fax, and real-time Internet communications capabilities. These systems are specifically adapted for use in global two-way, ground-to-air and air-to-ground communications by aircraft operators requiring global voice, fax, and Internet communications for their flight crews and passengers.

The combination of the aircraft onboard data communications accelerator 120 and router 110 and the ground based accelerator 220 and data router 210 provides a combination of data acceleration, compression and data caching, increasing the performance of the aircraft-to-ground and ground-to-aircraft communications.

In one embodiment, the data communication accelerator is installed onboard the aircraft in place of a standard router. In the preferred embodiment, the mobile aircraft communication system includes a Satcom Direct Router SDR as described in co-pending patent application Ser. No. 14/259,588 filed on Apr. 23, 2014. The SDR addresses the problem of disparate connection speeds between ground-based and ground-to-air based communication systems by increasing the effective network capacity of ground-to-air and air-to-ground communication systems. The data communication accelerator of the present invention can be integrated into the Satcom Direct router as described in the '588 patent application.

The Satcom Direct router integrates with Satcom Direct services, including AeroV®, SD Flight Tracker, SkyTicket, SkyShield and Aero XR®. Aero XR is Satcom Direct's next-generation Aero X® service described herein, which allows acceleration, compression and optimization of multiple satellite links and provides data caching over any satellite network.

The SDR is compatible with most existing Wi-Fi access points and includes 802.11n dual band (2.4+5.0 GHz) Wi-Fi and is backward compatible with 803.11b/g. Four or more simultaneous wireless networks are supported to allow multiple systems to operate on the aircraft without additional wireless access points. This allows for separate guest or dedicated VVIP networks. While the aircraft is on the ground, 3G/4G network connectivity is available through the SDR. For domestic and global roaming, Satcom Direct® offers data plans for global roaming through the use of the SDR's Dual-SIM module so customers can have the best roaming rates around the world.

Using the SDR integrated with the data compression and acceleration system of the present invention helps increase the performance of airborne communication services by simultaneously communicating with multiple satellites and creating a faster connection, caching frequently accessed data, thereby increasing data throughput. Each aircraft is provided with its own Internet protocol (IP) subnet such that the mobile aircraft-based and ground-based accelerators are able to recognize that the data stream is to be accelerated or decelerated, respectively.

The accelerator uses a combination of compression and acceleration technologies to significantly increase the bandwidth of the communication network. This accelerated traffic from the aircraft is then transmitted by satellite 300 to a ground-based communication station 200 as shown in FIG. 1. The ground station 200 recognizes that the traffic is accelerated, based upon the aircraft's IP address in one embodiment, and routes the traffic to ground-based system data communication accelerator where the traffic is subsequently decelerated. The decelerated traffic is then routed to a communication network, such as the Internet 400.

Similarly, for GTA traffic, data from the Internet or another source reaches the data communication accelerator at the ground-based system 200, the destination IP address of an aircraft is recognized as compatible with acceleration, and the data is accelerated. The accelerated data is transmitted by satellite to the aircraft, where the data is subsequently decelerated by the onboard data communication accelerator and sent to a data device, such as a computer, laptop, PDA, cell phone, or other data device.

Figure 2:
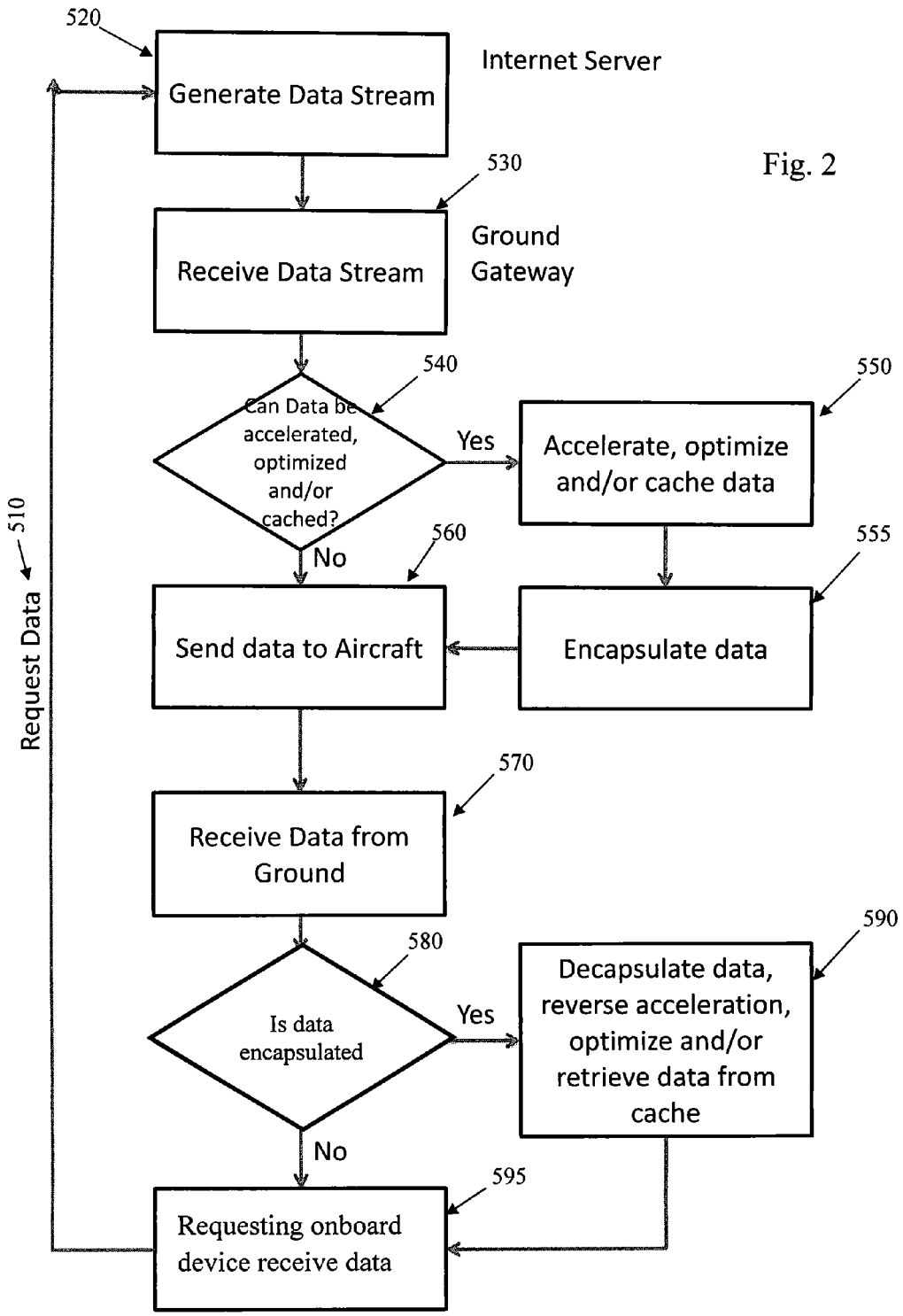
FIG. 2 is a process flow diagram showing the method for optimizing data transmission ground-to-air using acceleration, compression, optimization and or data caching.

FIG. 2 is a process flow diagram showing the method for data compression and acceleration for ground-to-air communication GTA and air-to-ground communication ATG. In the embodiment shown, the method of accelerating and or compressing ATG communications starts with a data request in step 510 from the flight deck or an onboard mobile communication device such as a computer, laptop computer, PDA, cell phone, media device, mobile data device and the like. In step 520 the Internet server generates the data stream which is received by the ground gateway in step 530. At the ground-based data accelerator it is determined if the data stream can be accelerated based on the destination of the data stream and optionally compressed based on the size of the data stream and/or cached in step 540.

If the data stream can not be optimized, the non-accelerated data stream is transmitted to the aircraft in step 560 by satellite as shown in FIG. 1. First, the satellite communication system 300 receives the data stream and transmits the data stream to the aircraft communication system 100. If the data stream can be accelerated, optimized and/or cached, the acceleration, optimization and/or caching is completed in step 550 at the ground station accelerator and the optimized data stream is encapsulated in step 550 and sent to the aircraft communication system in step 560 through the satellite communication system 300. At the aircraft-based communication system 100, the encapsulated data stream is decelerated and optionally decompressed in step 590 and routed to the requesting device in step 595. At the onboard accelerator, frequently accessed data streams can be stored in cache memory to be reused instead of retransmitting.

Both the airborne router and the ground-based system cache data. For data/bit caching, when the client device requests a webpage from a server, sends the webpage back to the client. During transmission, the Ground-based communication caching system inspects the content and determines if the content is cacheable content. If so, it 'marks' the block of data with a unique identifier and forwards the marked block of data on to the airborne router. Onboard the aircraft, the airborne router receives the data, notes that it's been marked and then stores a copy of the data block and the unique identifier for that data block. If another data block is sent from the ground based server, the ground-based communication system recognizes the same data, and instead of sending the data block, sends the unique identifier to the airborne router. When the airborne router sees the reference to the unique identifier, the router fetches a copy of the data block from the cache and sends it on to the requesting client device.

Typically the type of data being cached is web page content, both text/html, Javascript files included header/footer content and advertisements. Other static information that doesn't change each time you load a webpage can be cached such as mobile application data (i.e.: data from servers) and data stored in the 'Cloud'.

Figure 3:
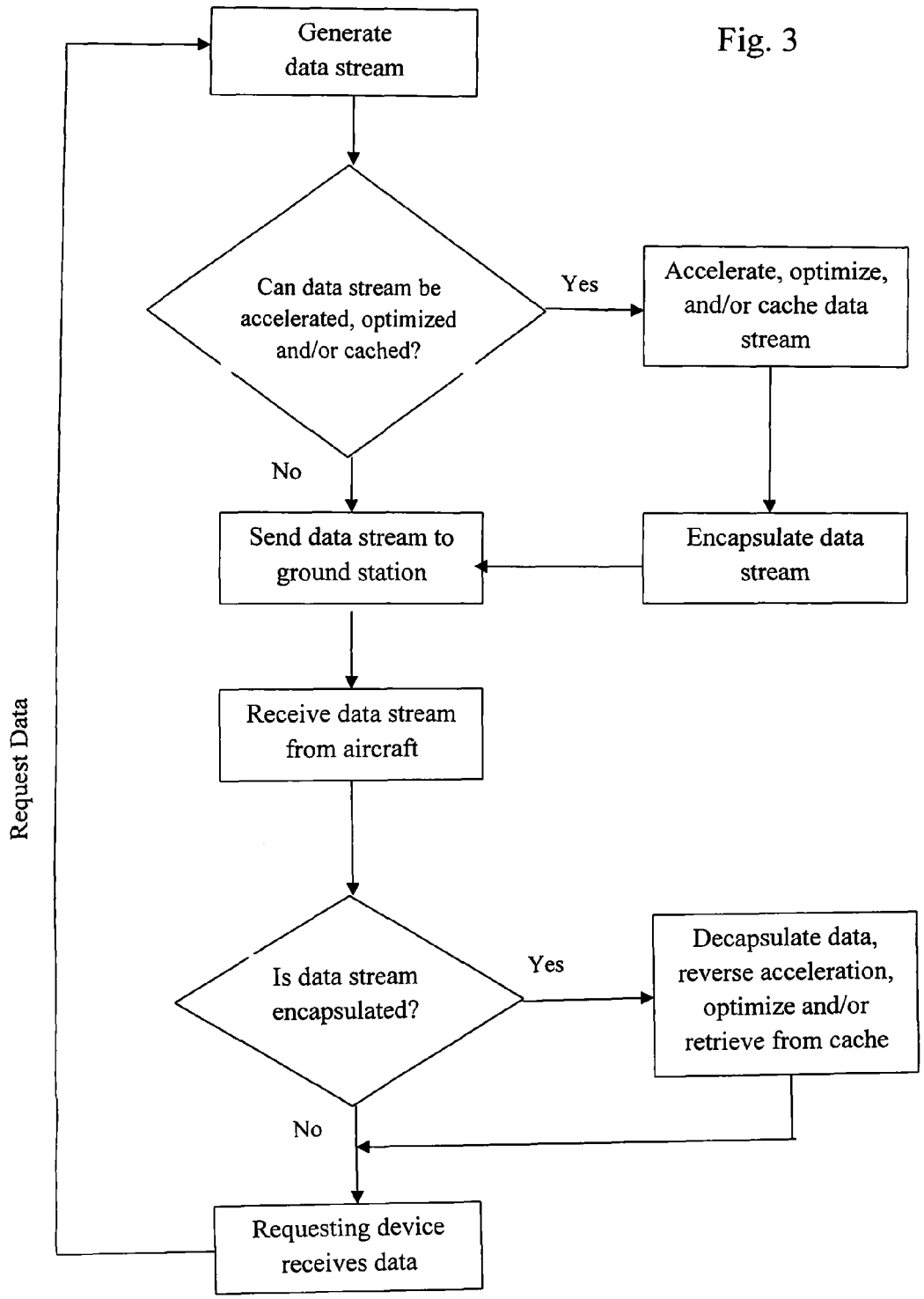
FIG. 3 is a process flow diagram showing the method for optimizing data transmission air-to-ground using acceleration, compression, optimization and or data caching.

FIG. 3 is a process flow diagram showing the steps for generating a data stream onboard the aircraft and transmitting the data stream to a destination via Internet. The method includes generating a data stream onboard the aircraft and determining a ground based destination for the data stream. The data stream is received at the onboard data communication system 120 where the data can be compressed based on the size of the data stream and accelerated based upon the destination. The accelerated or non-accelerated data stream is transmitted to the ground-based data communication router through the satellite communication system as shown in FIG. 1. If the data stream received is accelerated and or compressed, the data stream can be decelerated and or decompressed at the ground communication system and routed to a destination via the Internet.

For both ground-to-air communication and air-to-ground communication, the data stream can be cached at the ground based communication system router or the aircraft-based communication system accelerator.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. An accelerated ground-to-air and air-to-ground communication system comprising:
   at least one mobile aircraft-based communication system adapted to transmit and receive accelerated and or compressed data signals, the aircraft-based communication system including:
      an ISDN interface and two or more simultaneous network interfaces to allow multiple avionic systems to operate on an aircraft wherein a satellite communication link allows simultaneous use of two or more of Inmarsat, Swiftbroadband, Swift64, Ku-Band, and Ka-Band satellite connections to deterministically forward data communications over two or more of said communication links based on preset policies by a user;
      an onboard data communication router device adapted to route accelerated and non-accelerated signals and increase effective network capacity of ground to air and air to ground communication systems, the onboard data communication router device including QoS/Prioritization to locate bandwidth per device or person and prevents a single device from consuming all available bandwidth as well as prioritizing traffic for a VVIP;
      a multi-user onboard data communication accelerator device communicatively coupled to the onboard data communication router device and to a data network and adapted to accelerate and decelerate data signals from the data network and the onboard data communication router device; and
      a cache memory integrated with the onboard data communication accelerator device for storing and tracking frequently accessed data streams;
   a ground-based communication systems adapted to accelerate and or compress data signals for transmission and to receive accelerated and/or compressed data signals, decelerate and/or decompress the data signals, and cache and track the frequently accessed data streams at the ground-based communication system; and
   a satellite communication system communicatively coupled to the mobile air communication systems and to the ground-based communication system and adapted to transmit accelerated and non accelerated data signals between the mobile air communication systems and the ground-based communication systems.

2. The system of claim 1, wherein the ground-based communication systems comprises:
   a ground based data communication router device adapted to route accelerated and non-accelerated signals,
   a multi-user ground based data communication accelerator device communicatively coupled to the ground based data communication router device and to a data network, and adapted to accelerate and decelerate data signals from the data network and the ground based data communication router device; and a ground based cache memory coupled with the ground based data communication router for storing and tracking frequently accessed data streams.

3. The systems of claim 1, wherein the mobile aircraft-based communication systems further comprises:

a data communication device communicatively coupled to the data communication accelerator device and adapted to generate and receive non-accelerated data signals, the communication device is selected from the group consisting of a computer device, a laptop computer device, a cell phone, a personal digital assistant (PDA), a media device and a mobile data device.

4. The system of claim 1, wherein mobile aircraft-based communication system is further adapted to transmit and receive non-accelerated data signals, the ground-based communication system is further adapted to transmit and receive non-accelerated data signals, and the satellite communication systems is further adapted to transmit non-accelerated data signals between the mobile air communication system and the ground-based communication system.

5. The system of claim 1, wherein the onboard data communication router device is communicatively coupled to the data network and adapted to route non-accelerated data signals to the data network by bypassing the multi-user onboard communication accelerator device.

6. The system of claim 1, wherein the data communication router device is adapted to route accelerated and non-accelerated data signals according to an IP address.

7. The system of claim 1, where in the communicative coupling between the multi-user data communication accelerator device and the data network comprises:

at least one selected from the group consisting of an ISDN channel, a SwiftBroadBand channel, WiFi network connectivity on the aircraft, and a 3G/4G cellular network connectivity when the aircraft is on the ground.

8. The system of claim 1, where in the satellite communication system is further adapted to transmit accelerated data signals between the mobile air communication system and the ground-based communication system as a data packet consisting of an ISDN packet, a Swift64 packet, a SwiftBroadBand packet, a Ku-Band packet, and a Ka-Band packet.

9. The system according to claim 1 wherein said router integrates with services including Aero V, SD Flight Tracker, Sky Ticket, Sky Shield and Aero XR to allow for acceleration, compression and optimization of multiple satellite links and to provide data caching over any satellite network.

10. A method of accelerating ground-to-air and air-to-ground communication comprising the steps of:

interfacing an ISDN interface and two or more simultaneous network interfaces to multiple avionic systems to operate on an aircraft wherein a satellite communication link allows simultaneous use of two or more of Inmarsat, Swiftbroadband, Swift64, Ku-Band, and Ka-Band satellite connections to deterministically forward data communications over two or more of said communication links based on preset policies by a user;

initiating a request for data or data transmission by a data device onboard the aircraft and sending the request for data from the data device to an onboard data communication router adapted to route accelerated and non-accelerated signals and increase effective network capacity of ground to air and air to ground communication systems;

generating a data stream including the data request or data transmission at the onboard data communication router;

one or more of accelerating, compressing and caching the data stream at an aircraft based data accelerator device coupled with the onboard data communication router, the onboard data communication router including QoS/Prioritization to locate bandwidth per device or person and prevents a single device from consuming all available bandwidth as well as prioritizing traffic for a VVIP;

transmitting the accelerated and or compressed data stream from the mobile aircraft to a ground-based communication system through a satellite communication system;

one or more of decelerating, decompressing and caching the data stream at the ground-based communication system; and routing the decelerated and decompressed data stream to a destination.

11. The method of claim 10, further comprising the steps of:

receiving requested data from a destination source at a data communication accelerator at the ground-based communication system;

determining if a destination IP address of an aircraft is recognized as compatible with acceleration, compression and caching;

one or more of accelerating and compressing the requested data when the destination IP address is recognized as compatible with acceleration;

transmitting the accelerated and or compressed data by satellite to the onboard data communication router;

decelerating and or decompressing the accelerated data by the onboard data communication accelerator; and sending the decelerated and or decompressed data to the requesting data device.

12. The method of claim 11, further comprising the steps of:

receiving the requested data at the ground-based communication system from a destination source;

determining if a content of the requested data is cachable;

identifying the content with a unique identifier when the content is cachable;

sending the uniquely identified content to the onboard data communication router; and sending the requested data to the onboard data communication router when it is determined that the content is not cachable.

13. The method of claim 12 further comprising:

tracking the cached data and upon request for the cached data, indicating that the cached data stored on the aircraft based data communication accelerator device can be reused instead of retransmitting the requested data stream.

14. The method of claim 10, wherein determining cachable content step includes the step of:

determining that the content is one of a text/html data, a Javascript file or an advertisement.

15. The method of claim 10 further comprising the step of:

bypassing the aircraft based data accelerator device and transmitting the generated data stream from the onboard data communication router.

16. The method of claim 10, further comprising the step of:
  simultaneously using Swiftbroadband, Swift64, Ku-Band, and Ka-Band satellite connections.

17. The method according to claim 10 further comprising the step of integrating said router with services including Aero V, SD Flight Tracker, Sky Ticket, Sky Shield and Aero XR to allow for accelerating, compressing and optimizing multiple satellite links and providing data caching over any satellite network.

18. An accelerated ground-to-air and air-to-ground communication system comprising:
  an ISDN interface and two or more simultaneous network interfaces to allow multiple avionic systems to operate on an aircraft wherein a satellite communication link allows simultaneous use of two or more of Inmarsat, Swiftbroadband, Swift64, Ku-Band, and Ka-Band satellite connections to deterministically forward data communications over two or more of said communication links based on preset policies by a user;
  at least one mobile aircraft-based communication systems adapted to transmit and receive accelerated and or compressed data signals, the ground-based communication system including:
    an onboard data communication router device adapted to route accelerated and non-accelerated signals and increase effective network capacity of ground to air and air to ground communication systems, the onboard data communication router device including QoS/Prioritization to locate bandwidth per device or person and prevents a single device from consuming all available bandwidth as well as prioritizing traffic for a VVIP;
    a multi-user onboard data communication accelerator device communicatively coupled to the onboard data communication router device and to a data network and adapted to accelerate, compress, and cache and decelerate and decompress data signals from the data network and the data communication router device; and
    a cache memory integrated with the onboard data communication accelerator for storing and tracking frequently accessed data streams;
  a ground-based communication system adapted to transmit and receive accelerated and or compressed data signals, the ground-based communication system including:
    a ground based data communication router device adapted to route accelerated and non-accelerated signals,
    a ground based multi-user data communication accelerator device communicatively coupled to the data communication router device and to a data network and adapted to accelerate, compress and cache and decelerate and decompress data signals from the data network and the data communication router device; and
    a cache memory integrated with the ground based multi-user data communication accelerator device for storing and tracking frequently accessed data streams; and
  a satellite communication system communicatively coupled to the mobile air communication systems and to the ground-based communication system and adapted to transmit accelerated data signals between the mobile air communication systems and the ground-based communication systems.

19. The system according to claim 18 wherein said router integrates with services including Aero V, SD Flight Tracker, Sky Ticket, Sky Shield and Aero XR to allow for acceleration, compression and optimization of multiple satellite links and to provide data caching over any satellite network.

* * * * *